3,296,016
PRODUCTION OF MICROPOROUS COATING
ON SUBSTRATE
Walter T. Murphy, Cuyahoga Falls, Ohio, assignor to
The B. F. Goodrich Company, New York, N.Y., a
corporation of New York
No Drawing. Filed Oct. 31, 1963, Ser. No. 320,554
8 Claims. (Cl. 117—105.5)

This invention relates to a process for producing microporous films and sheets of polymeric materials. It is more particularly related to a process for producing microporous sheets in conjunction with a substrate layer.

Vapor permeable polymeric films are becoming of increasing interest, particularly when laminated to or used as a coating on a porous substrate to form a replacement for leather. Vapor permeable leather replacements have been prepared in the past by applying polymeric coatings, particularly polyvinyl chloride, to suitable porous substrates, then mechanically piercing the coating on a conventional textile needle loom. An objectionable feature of this method is that the holes in the surface layer are usually visible and unattractive to the eye. Attempts have also been made to create holes in the coating film by use of a blowing agent. More recently, United States Patent 3,000,757 has taught the process of forming a polymeric solution of a polymeric polyalkyleneetherurethane in a hygroscopic solvent, coating this solution on a suitable porous substrate, exposing the coated substrate to an atmosphere with relative humidity of 15 to 100% at dry bulb temperature of 50° to 100° F., thus coagulating the polymer coating, and finally removing the residual hygrosopic solvent by washing, thereby leaving the polymer in the form of a microporous coating on the substrate. It is believed that the polymer solvent picks up the nonsolvent gradually and that the polymer coagulates as particles adhering to each other at irregular patches leaving channels still occupied by solvent which is then extracted by immersing the film in a nonsolvent bath. The materials produced have good drape and feel properties and permeability similar to that of leather. Drawbacks to this latest process, however, are the facts that only limited thicknesses of polymer coating can be applied at one time or pass. A preferred method is to spray several thin layers, usually each less than 2 mils thick, of polymeric solution on the substrate. Between each spraying the coating is exposed 30 to 300 seconds in the coagulating, pore-forming atmosphere of moist, warm air. Layers up to 15 mils are preferably applied by spraying, requiring 6 to 7 complete passes of the material with accumulated passage of time. Heavier coatings, up to about 40 mils, may be applied to the substrate by a single pass under a doctor knife. These coatings are coagulated and cured by a single exposure to warm moist air, but by virtue of the thickness of the coating, this single exposure takes longer than the combined periods for single sprays and cures described above. I have learned that this process also requires a critical rate of moisture introduction, too high a rate results in skin forming (loss of permeability) and too low a rate requires excessive time to obtain polymer coagulation.

It is an object of this invention to provide a process for applying a polymeric solution to a substrate and coagulating said solution to form a microporous structure in sheets or film form as a coating on the substrate in any desired thickness from 2 mils to 40 mils or greater with essentially only one application of polymeric solution to the substrate. On an impervious substrate the coating forms a removable microporous film; on a porous substrate the coating forms a microporous laminate layer. Other subjects will be apparent from the description below.

The aims of this invention are accomplished by employing a double, or simultaneous, spray technique. Two sprays are directed to impinge on the substrate at the same time and covering the same contact area. I describe these sprays as coincident sprays. One spray contains a solution of polymer in a hygroscopic solvent; the second contains a material which is a nonsolvent for the polymer, but which is completely miscible with the polymer solvent. The effect of this double spray is to place the polymer solution on the substrate, coagulate the polymer from the solution onto the substrate in a microporous structure or coating, and flush away substantially all of the no longer needed polymer solvent in the form of a solvent-nonsolvent mixture. Either the substrate or the spray, or both may be in motion as the polymeric layer is applied to the substrate. Therefore my process lends itself readily to economical continuous operation. The length of time that the sprays impinge on any given spot of the substrate partly determines the thickness of microporous polymer buildup at the spot. The sprays are usually passed back and forth over the area to be coated in a continuous reciprocating traverse motion until the desired thickness of deposited polymer is formed. A slight control of polymer buildup is possible also by increasing or decreasing the solids content of the polymer solution, but to have a sprayable solution, fairly dilute solutions, preferably from 3% to 15% by weight are favored and it is easier to control the rate and depth of polymer buildup on the substrate by controlling the rate of movement of either the spray, the substrate, or both together. If a solution is too high in total solids to spray readily, it may be improved by lowering the viscosity either by adding solvent or by warming the solution. Any residual solvent-nonsolvent mixture is readily removed by any convenient washing and drying operation.

The effective area of substrate covered by the coincident sprays will vary with the nozzle configuration, the pressure applied to the spray head, and the distance of the nozzles from the substrate. Commercially available spray guns such as are used in the paint industry are useful in the practice of this invention. These spray guns fall into one of two classes, air guns and airless guns. Either type is useful in the practice of my invention, but I prefer the airless gun as it delivers finer droplets and forms a spray that has a more sharply defined perimeter than does the air gun. The electrostatic spray technique in which the polymer particles are given a charge and the substrate to be sprayed is given an opposite charge is also applicable to the practice of this invention.

By way of example of how my invention is accomplished, if the coincident sprays cover a longitudinal span of six inches on the substrate, the sprays can be guided to traverse the width of the substrate and the substrate can be simultaneously moved forward so that the substrate will have moved forward one inch in the time the sprays have taken to make a traverse. By the time the sprays have made 6 traverses, the substrate will have moved forward 6 inches. If the sprays are set to deposit a polymer layer 2 mils thick, on each traverse, then the first inch of substrate will have a layer of polymer 2 mils thick covering it. The third inch will be covered by 6 mils and the sixth and each succeeding inch will be covered by 12 mils of microporous polymer. Many variations from these speeds, dimensions and rates are possible while keeping within the limits of my invention.

The two sprays of polymer in solvent and polymer nonsolvent are directed so that they combine and overlap at or before striking the substrate. Preferably the distance between the spray nozzles and the substrate is 4 to 15 inches. If the distance is too short, there is a spattering effect which leads to nonuniform deposition of the coating, and if the distance is too great, the spray will become too diffuse and scattered to deposit a coating of economical thickness. The intimate mixing of the two sprays is believed to be very important to the operation of my invention. Despite the fact that the sprays are preferably mixed and concurrent when they strike the substrate, I have found that it is preferable to not mix the fluids before they reach the spray nozzle, and that two sprays from separate nozzles should not be mixed in a space of less than about one inch from the nozzles. If the sprays are combined too quickly, the polymer coagulates in tenuous strings and lumps and deposits as a lumpy, nonuniform coating on the substrate. The separate sprays should have a chance to form into discrete droplets before they are mixed. When the sprays are properly mixed at some point beyond the critical one inch distance from the nozzle, the polymer coagulation rate is acceptable for deposition of uniform microporous coating layers. The maximum distance the spray nozzles can be located away from the substrate to be coated is dependent on the pattern of the spray from the nozzle. As the distance of nozzle from substrate increases, the spray striking the substrate becomes more diffuse and undesirable spattering effects at the spray periphery are noticed. The effect obtained in my invention is the coagulation of the polymer in small particles which lie on each other with enough polymer solvent present to stick the particles together at the points of contact. The residual polymer solvent is then extracted by promptly immersing the film in a bath of liquid miscible with the polymer solvent, but not itself a solvent for the polymer, thus leaving vacant micropores in the structure.

The polymers used in the microporous coating to form leatherlike structures are preferably polyurethane condensation polymers. They must be essentially linear and cannot be heavily cross linked, for they must readily dissolve in proper solvents to form the spray solutions. Polyesterurethanes and polyalkyleneetherurethanes may be employed. The particular polymers employed are not a part of this invention. Typical polyesterurethanes which are useful include those described in United States Patent 2,871,218. These polyesterurethanes are reaction products of one mol of essentially linear hydroxyl terminated polyester of a saturated, aliphatic glycol having from 4 to 10 carbon atoms and having hydroxyl groups on its terminal carbon atoms and a carboxylic acid of the formula HOOC—R—COOH where R is an alkylene radical containing from 2 to 8 carbon atoms or the anhydride of such an acid, said polyester having an average molecular weight between 600 and 1200 and having an acid number less than 10, with from 1.1 to 3.1 mols of a diphenyl diisocyanate having an isocyanate group on each phenyl nucleus in the presence of 0.1 to 2.1 mols of a saturated, aliphatic free glycol containing from 4 to 10 carbon atoms and having hydroxyl groups on its terminal carbon atoms, the molar amount of said polyester and said free glycol combined being essentially equivalent to the molar amount of said diphenyl diisocyanate whereby there are essentially no unreacted isocyanate or hydroxyl groups in the reaction product.

The preferred basic polyesters which are utilized are those prepared by esterification of such dicarboxylic acids as adipic, succinic, pimelic and sebacic, particularly adipic acid.

Glycols used to prepare the polyester are preferably the straight chain glycols containing 4 to 10 carbon atoms such as butanediol-1,4 and decamethylenediol-1,10. Any of these glycols, preferably butanediol-1,4, may be employed as the free glycol present when the polyester is reacted with the diisocyanate.

Diphenyl diisocyanates such as diphenyl methane diisocyante, diphenyl methane-p,p'-diisocyanate, and diphenyl ether diisocyanate are used to react with the mixture of polyester and free glycol.

For a preferred polyesterurethane of this type, a mixture of 1447 grams (1.074 mols) of hydroxyl poly(tetramethylene adipate), molecular weight 849, hydroxyl number 130.4, and number 0.89, and 109.6 grams (1.218 mols) of butanediol-1,4 is melted and stirred for 20 minutes at a pressure of 5–6 mm. at 100° C. to 110° C. Next 730 grams (2.92 mols) of diphenyl methane-p,p'-diisocyanate are added and the mixture is stirred one minute and poured into a sealed container and placed in a 140° C. oven for 3.5 hours to complete the reaction.

Useful linear polyalkylene ether glycol:free glycol:aromatic diisocyanate polymers are described in United States Patent 2,899,411.

Polyalkylene ether glycol:diisocyanate polymers prepared by the technique of chain extending prepolymers are also useful in my invention. These prepolymers are prepared by chain extending a prepolymer having a molecular weight from 750 to 10,000 with a compound having two active hydrogen atoms. One or more polyalkylene ether glycols are mixed with a molar excess of diisocyanate and the mixture is heated from 50° C. to 120° C. to form a polymer having terminal-NCO groups. Alternatively, one can react the diisocyanate with a molar excess of polyalkylene ether glycol and cap the resulting hydroxyl-terminated product by reacting it with more diisocyanate to form a prepolymer having terminal-NCO groups.

Useful polyalkylene ether glycols include polyethylene ether glycol, polypropylene ether glycol, polydecamethylene ether glycol and mixtures thereof.

The diisocyanates useful for preparing the prepolymers include aromatic, aliphatic and cycloaliphatic diisocyanates such as m-phenylene diisocyanate, 1,6-hexamethylene diisocyanate, and 1,5-tetrahydronaphthalene diisocyanate.

The prepolymer of polyalkylene ether glycol and diisocyanate is chain-extended with a compound having two active hydrogen atoms to form a substantially linear polymer with molecular weights from 25,000 to 300,000. Favored chain-extenders include hydrazine, water, ethylene glycol and dimethyl piperazine. Polymers of this type are described in United States Patent 2,692,873.

Vinyl polymers such as polyvinyl chloride, polyalkyl acrylates such as polyethyl acrylate, polyacrylonitrile and copolymers thereof can also be dissolved in appropriate solvents and deposited on substrates as microporous films by the procedure of this invention. Mixtures of vinyl polymers and mixtures of vinyl polymers with linear polyurethane polymers can be sprayed and deposited on substrates in microporous films or coatings of thicknesses of 2 to 40 mils by the method of this invention. When mixtures of linear polyurethanes and vinyl polymers are used, it is generally preferred to use 100 parts or less of vinyl polymers per 100 parts of polyurethane polymer to get adequate strength in the flexible film formed. Fillers, pigments, dyes and the like may be added to the polymer solution as long as they do not interfere with solution sprayability.

The microporous vinyl polymer films are found to be particularly useful in applications such as upholstery and for garments ranging from jackets and gloves to baby pants. The microporous polyurethane polymer films are particularly useful as replacements for soft suede and chamois. When adhered to a porous, fibrous substrate they are readily useful as replacements for leather in clothing such as jackets and shoe uppers, luggage, gloves and the like.

Typical fibrous substrates to which the microporous polymer layers are applied include woven twills and ducks, jersey and tricot knitted materials, felts, and non-woven webs (regardless of how formed). Particularly in the case of the non-woven webs, the webs may have been preshrunk, needled, saturated and impregnated with vinyl, vinylidene or condensation polymer resins. The porous substrates may be made from natural or manmade fibers, polyamides, polyolefins, polyesters, viscose rayon, wool, cotton, glass and the like, or mixtures thereof.

Leather substitutes formed by depositing microporous polyurethane coatings of this invention on a fibrous substrate may be embossed in a simulation of the appearance of natural leather and buffed and dressed to further improve their appearance and hand. Standard leather buffing apparatus employing silica, emery, or similar coated abrasive paper may be used. Preferable top dressings include conventional shoe polishes, and pigmented synthetic latices such as butadiene:acrylonitrile and solutions of linear polyesterurethane condensation polymers.

The polymer to be sprayed is first dissolved in a hygroscopic solvent. Preferred solvents include N,N'-dimethyl formamide, dimethyl sulfoxide, tetrahydrofuran and tetramethylurea. The polymer solution is placed in one chamber of a double spray unit and a second liquid, which is a nonsolvent for the polymer being sprayed but is completely miscible with the solvent being used for said polymer, is placed in the second spray chamber. These inert solvents include water, ethylene glycol and glycerol. Water is preferred.

The spray heads are adjusted so that the sprays will comingle at a distance usually between 2 and 5 inches from the nozzles. As the sprays strike a surface to be coated they are completely mixed and cover the same area of the surface. It is possible to have the polymer solution spray strike the surface first, followed at an interval no greater than a few seconds by the nonsolvent spray, but better results are obtained by operating the sprays so that they are convergent and coincident at the surface being coated. If too great a time elapses before the nonsolvent spray strikes the deposited polymer solution, the leaching out of polymer solvent will be too slow and the process will have to be delayed to complete this step. In addition the surface produced tends to be rough, irregular and lumpy.

The polymer solution-nonsolvent mixture may be sprayed on to an impervious surface such as glass or polished metal and a microporous film forms which can be stripped from the base stratum for further processing.

The two sprays, as noted above, may impinge on a traveling substrate while the sprays are moving transversely thereto. The substrate may travel in either a horizontal plane or a vertical plane. The important consideration here is that the solvents do not flow back on to uncoated substrate, for this tends to cause poor adhesion.

As the coated substrate moves on past the spray area it is readily directed over embossing rolls, and since the coating is still tacky, it takes an emboss design (or may be left smooth) and further is subjected to some compaction which improves adhesion of the surface laminate to the substrate and also greatly improves abrasion resistance of the final product. The microporous polymer laminate is conveyed to a water bath to remove more residual hygroscopic polymer solvent. It is next directed through a drying chamber or over drying rolls to remove the last traces of solvent-nonsolvent mixture and leave a dry flexible, microporous structure. It is preferred that all polymer solvent be washed out before the drying is started to prevent fusion of the surface and loss of porosity and permeability. These laminates can be produced through a range of flexibility, softness, porosity, abrasion resistance, tear strength and lastability depending upon the particular polymers and solvents employed, the thickness of the porous polymer layer deposited, the ratio of the spray volumes, the substrate medium employed, the amount of compaction or squeezing applied and the time elapsed between deposition of the sprays and the water rinse to remove residual polymer solvent. The most soft and flexible materials have the feel of drapy suede and can be used for clothing garments. Stronger, harder materials are found to have excellent abrasion, porosity and tear strength and make excellent shoe upper materials. Other materials can be produced that fabricate into upholstery, luggage and the like.

The following examples are intended to illustrate the invention and not to limit it in any way. Parts are by weight unless otherwise specified.

EXAMPLE I

A 10% solution of Estane VC 5740X1, a linear, hydroxyl-terminated polyesterurethane sold by B. F. Goodrich Chemical Company is prepared in dimethyl formamide (DMF). This solution is connected to an atomizing spray gun. A tank of water is connected to a second spray gun. The sprays are directed at a vertical glass plate and are held at such a distance from, and position in relation to the glass plate, that the two sprays mix in the air about 2 to 3 inches from the plate and overlap and are thoroughly intermixed as they strike the plate as effectively one spray. The coagulated polymer immediately forms an opaque film on the glass. Excess water and DMF run off without streaking the deposited polymer. The film build-up is uniform as the sprays are moved at a uniform rate in a horizontal traverse across the glass plate. The sprays are retraversed over the same area at once to continue the buildup of polymer film.

The glass plate and deposited film are immersed in water immediately after the second traverse to remove residual DMF which may still be in the film. The film is dried in an air oven at 80° C., stripped from the glass and is found to be porous and rubbery, 3–4 mils thick with a moisture vapor transmission (MVT) equal to 84% of that of a piece of calfskin leather.

EXAMPLE II

Two De Vilbiss spray guns, model P–MBC–510, are connected to separate tanks of water and 10% polyesterurethane solution. The guns are regulated to spray equal volumes from the supply tanks with the sprays intersecting and overlapping 2 inches from the substrate and striking the substrate as a single spray. Fifteen passes are found to deposit 16 mils of polymer film. Moisture vapor transmission data on films on various substrates are set forth.

*Table 1*

| Run | Substrate | No. of Passes | MVT (percent of Calfskin leather) |
|---|---|---|---|
| A | Glass (film stripped off after drying). | 15 | 79 |
| B | Nonwoven polypropylene, 3 denier, 8 oz. per sq. yd., .030 inch thick. | 15 | 52 |
| C | Woven cotton duck, 1.4 oz. per sq. yd., .030 inch thick. | 15 | 102 |

To improve the smoothness of the deposit of polymer on glass and the adhesion of deposited polymer on fabric, two passes are first made with the polymer solution alone, followed by 13 passes of simultaneous water and polymer solution spray. Data are set forth below.

Table 2

| Run | Substrate | No. of Passes Polymer alone/ Polymer+water | MVT (percent of Calfskin leather) |
|---|---|---|---|
| D | Glass (film stripped off after drying). | 2/13 | 104 |
| E | Woven bleached sateen 7.2 oz./sq. yd. 96x64 count. | 2/13 | 76 |
| F | Pebble grain steel emboss plate | 2/13 | 105 |
| G | Nonwoven single ply polypropylene, 3 denier, 5 oz./sq. yd. | 2/13 | 76 |
| H | Nonwoven polyterphthalate ester, 3 oz./sq. yd. plus 4½ oz./sq. yd. acrylic latex saturant. | 2/13 | 75 |

EXAMPLE III

To determine if porosity of the deposited films varies when different times, denoted "fusion times," are allowed to elapse between the final traverse of the sprays and the water immersion of the film to remove residual DMF, the following series of runs is made.

Table 3

| Run | No. of Passes Polymer alone/ Polymer+water | Fusion time, minutes | Weight ratio polymer solution/water | MVT (percent of Calfskin leather) | Thickness of top film, mils | Thickness of top film+substrate, mils |
|---|---|---|---|---|---|---|
| I | 2/8 | 30 | 1.0/1.0 | 88 | 23 | 44 |
| J | 2/8 | 15 | 1.0/1.0 | 102 | 24 | 45 |
| K | 2/8 | 5 | 2.0/1.0 | 92 | 22 | 43 |
| L | 2/8 | 0 | 2.2/1.0 | 120 | 25 | 46 |

Study of Table 3 shows that when the ratio of polymer solution to water is kept constant and fusion time is decreased, MVT increases (I, J). If polymer solution to water ratio is increased and fusion time is decreased, the effects virtually cancel each other (K). The shorter the fusion time and the lower the ratio of polymer solution to water, the greater will be the MVT value of the deposited film.

EXAMPLE IV

Employing one of the spray guns and the two solutions used in Example III, the spray gun is adjusted to mix the water and the polymer solution immediately before the mixed solution passes the nozzle and forms a spray. The result is a lumpy nonuniform deposit of polymer.

EXAMPLE V

Mixtures of the linear polyesterurethane polymer used in Example I are prepared with a polyvinyl chloride resin, Geon 121, a product of B. F. Goodrich Chemical Company in dimethyl formamide. The solutions are all 10% total polymer by weight. The sprays are set to deliver equal volumes of polymer solution and water. When the thickness of polymer deposited on the substrate is about 50 mils, the coated substrate is immersed in water to extract residual DMF solvent. Finally the substrates are air dried.

| Run | Parts polyurethane/parts vinyl resin | Substrate | MVT (percent of Calfskin leather) |
|---|---|---|---|
| M | 50/50 | Bleached sateen 7.2 oz./sq. yd., 96 x 64 count. | 112 |
| N | 50/50 | Glass | 118 |
| O | 75/25 | Sateen as above | 76 |
| P | 75/25 | Glass | 95 |
| Q | 0/100 | do | 123 |

The solution of run M and a 10% solution of polyesterurethane as described in Example I are each applied by the double coincident spray technique using water as the nonsolvent, to a porcelain glove form, building up porous films having thickness of 20 mils when dried. The gloves are soft textured, have a warm feel to the hand and feel much like kid leather. The hand does not feel clammy and sweaty after a few minutes' wear as is the case with household rubber gloves. Lightweight, porous baby pants and girdles are also prepared by applying the coincident spray technique with the polyurethane polymer solution of Example I to smooth metal forms for these articles.

EXAMPLE VI

The 10% solution in dimethyl formamide used in Example V, run Q, is combined in equal amounts with a 10% solution of dioctyl phthalate plasticizer in dimethylformamide in the coincident spray process making the first two passes with polymer solution only. The construction is immersed in a water bath to remove residual DMF, and then air dried or oven dried.

| Run | Parts vinyl resin, parts plasticizer | Substrate | Dry film thickness, mil | MVT (percent of Calfskin leather) | Remarks |
|---|---|---|---|---|---|
| R | 50/50 | Lawn cloth | 25 | 28 | Flexible opaque, soft, flannel like yet smooth. |
| S | 50/50 | Blended sateen, 7.2 oz./sq. yd., 94 x 64 count. | 35 | 88 | Soft, porous, opaque. |
| T | 50/50 | Glass | 35 | 106 | Smooth, opaque, porous, soft dry hand. |

I claim:
1. A process for forming a microporous film which comprises forming a 3% to 15% by weight polymeric solution of a polymer selected from the group consisting of substantially linear polyurethane polymer, polyvinyl chloride, and mixtures thereof in a hygroscopic solvent and spraying said polymeric solution onto a base stratum coincidentally with a spray of nonsolvent for said polymer, said nonsolvent being completely miscible with said hygroscopic polymer solvent, said sprays being mixed after they have traveled far enough from their sources to form discrete droplets.

2. The process of claim 1 wherein the base stratum is a nonwoven fabric.

3. The process of claim 1 wherein the base stratum is a woven fabric.

4. A process for forming a microporous film which comprises forming a 3% to 15% by weight dimethyl formamide solution of a substantially linear polyurethane polymer and spraying said solution onto a base stratum coincidentally with a spray of water, said sprays being mixed after they have traveled far enough from their sources to form discrete droplets.

5. A process for forming a microporous film which comprises forming a 3% to 15% by weight hygroscopic solvent solution of a substantially linear polyurethane polymer and a vinyl chloride polymer and spraying said solution onto a base stratum coincidentally with a spray of water, said sprays being mixed after they have traveled far enough from their sources to form discrete droplets.

6. A process for forming a microporous film which comprises forming a 3% to 15% by weight polymeric solution of a polymer selected from the group consisting of substantially linear polyurethane polymer, polyvinyl chloride, and mixtures thereof in a hygroscopic solvent and spraying said polymeric solution onto a base stratum coincidentally with a spray of nonsolvent for said polymer, said nonsolvent being completely miscible with said polymer solvent, said sprays being mixed after they have traveled far enough from their sources to form discrete droplets, employing a continuous reciprocating traverse motion of the coincident spray until the desired thickness of polymer is formed on the base stratum.

7. A process for forming a microporous film which comprises forming a 3% to 15% by weight dimethyl formamide solution of a substantially linear polyurethane polymer and spraying said solution onto a base stratum coincidentally with a spray of water, said sprays being mixed after they have traveled far enough from their sources to form discrete droplets, employing a continuous reciprocating traverse motion of the coincident spray until the desired thickness of polymer is formed on the base stratum.

8. A process for forming a microporous film which comprises forming a 3% to 15% by weight hygroscopic solvent solution of a substantially linear polyurethane polymer and a vinyl chloride polymer and spraying said solution onto a base stratum coincidentally with a spray of water, said sprays being mixed after they have traveled far enough from their sources to form discrete droplets, employing a continuous reciprocating traverse motion of the coincident spray until the desired thickness of polymer is formed on the base stratum.

References Cited by the Examiner
UNITED STATES PATENTS

| | | | |
|---|---|---|---|
| 2,450,503 | 10/1948 | Drummond | 117—106 |
| 2,563,457 | 8/1951 | Dolbey | 117—105.5 X |
| 2,692,873 | 10/1954 | Langerak et al. | 260—77.5 |
| 2,871,218 | 1/1959 | Schollenberger | 260—32.6 |
| 3,000,757 | 9/1961 | Johnston et al. | 117—63 |
| 3,100,721 | 8/1963 | Holden | 117—135.5 |
| 3,169,885 | 2/1965 | Golodner et al. | 117—135.5 |
| 3,208,875 | 9/1965 | Holden | 117—63 |

WILLIAM D. MARTIN, *Primary Examiner.*

THEODORE G. DAVIS, *Assistant Examiner.*